BISTABLE RELAY CIRCUIT

Filed July 16, 1962 5 Sheets-Sheet 1

INVENTOR.
WYMAN L. DEEG
BY Mason, Kolehmainen, Rathburn and Wyss.
ATTORNEYS

INVENTOR.
WYMAN L. DEEG
BY Mason, Kolehmainen, Rathburn and Wyss.
ATTORNEYS

BISTABLE RELAY CIRCUIT

Filed July 16, 1962 5 Sheets-Sheet 3

INVENTOR.
WYMAN L. DEEG
BY
Mason, Kolehmainen, Rathburn and Wyss
ATTORNEYS

BISTABLE RELAY CIRCUIT

Filed July 16, 1962 5 Sheets-Sheet 4

INVENTOR.
WYMAN L. DEEG
BY
Mason, Kolehmainen, Rathburn and Wyss.
ATTORNEYS

BISTABLE RELAY CIRCUIT

Filed July 16, 1962 5 Sheets-Sheet 5

INVENTOR.
WYMAN L. DEEG
BY Mason, Kolehmainen, Rathburn and Wyss
ATTORNEYS 3,244,942
Patented Apr. 5, 1966

3,244,942

BISTABLE RELAY CIRCUIT

Wyman L. Deeg, Glenview, Ill., assignor to C. P. Clare & Company, Chicago, Ill., a corporation of Delaware Filed July 16, 1962, Ser. No. 210,119
25 Claims. (Cl. 317—137)

This invention relates to a control module and circuits for employing and controlling the module and, more particularly, to control modules and circuits using sealed magnetic switches.

In most data handling, telemetering, and communication systems, many of the data handling or switching functions, such as counting or bit storage, are performed by a relatively small number of basic circuit configurations. The use of telephone type relays in these circuits has, to a considerable degree, been supplanted by the use of controlled conduction means, such as solid state devices and vacuum or gaseous discharge tubes, because of the improved operating characteristics and smaller sizes of the latter devices. Controlled conduction devices are, however, relatively expensive and do not possess the operating life that is often desired. In addition, many circuit applications do not require the operating speeds provided by, for example, solid state devices, but do require improved circuit isolation and the ability to operate over extended periods of time in adverse environmental conditions.

Accordingly, one object of the present invention is to provide a new and improved control module for data handling apparatus which uses sealed magnetic switches.

Another object is to provide a new and improved magnetic switching module for use in signal counting and storing circuits.

A further object is to provide a new and improved modular arrangement of flux controlled magnetic switches and controllable flux generated means.

Another object is to provide a control module including two sealed magnetic switch means, winding means for each of the switch means, and circuit means interconnecting the winding and switching means to provide a flux controlled switching or bit storage unit.

Another object is to provide a circuit module including sealed magnetic switch units, windings for the switch units, and means for operating and resetting the modules by selectively generating balanced and unbalanced flux fields in the units.

Another object is to provide a control module in which two groups of flux operated sealed magnetic switches are selectively operated and released by two pairs of diode coupled, double-wound coils.

A further object is to provide a counting circuit in which counting operations are performed by flux logic.

A further object is to provide a new and improved counting circuit comprising coupled stages of flux controlled magnetic switches.

A further object is to provide a counting or register circuit using flux operated sealed switches including new and improved means for controlling the operation of the switches by the selective generation of flux fields of different polarities.

In accordance with these and many other objects, one embodiment of the invention comprises a module having two groups of flux responsive or magnetic sealed switch units. Each group of sealed switches is operated by an individual double-wound coil that provides magnetic flux fields of equal strength and opposite polarities. The two coils in each winding are coupled to each other through a diode, and the like electrodes of the two diodes are directly connected to each other to couple the two winding means. The first or "X" winding means controls one or more normally open sealed magnetic switch units. The second or "Y" winding means controls four sealed magnetic switch units, and a bias magnet disposed adjacent two of these sealed switches normally biases these two switch units to a closed condition so that the second or "Y" group of switches provides transfer contacts.

The control module includes a set or input terminal connected to the "Y" winding means so that when an input signal or pulse is received, the two coils of the "Y" winding are energized to develop oppositely directed fields that prevent the operation of any of the second or "Y" group of sealed switch units, the energizing circuit for one of the coils in the "Y" winding means passing through the coupling diode. This diode also forwards the input signal or pulse to one of the coils in the "X" winding means, the input signal being blocked from the other coil of the "X" winding means by the diode in the "X" winding means. This permits the energization of only a single coil in the "X" winding means so that first or "X" group of magnetic sealed switches operate to a closed condition. Some of the "X" magnetic sealed switch units can be used to provide output signals, and one of these sealed switches is connected between a source of latching potential and a single coil in each of the "X" winding means and the "Y" winding means, the other coil in each of the "X" and "Y" windings means being isolated from the latching potential by the coupling diodes. When the input signal is terminated, a single coil in the "X" winding remains energized to hold the "X" switches in a closed condition. However, only a single coil in the "Y" winding is now energized, and the "Y" or second group of sealed switches are operated to provide an output from the module indicating that the module is in its set condition.

The module remains in this condition until such time as a reset signal or pulse is supplied to a reset terminal connected to the "X" winding means. This signal directly energizes one of the coils in the "X" winding means and is forwarded through the coupling diode in the "X" winding means to energize the second coil of the "X" winding and one of the coils in the "Y" winding. The energization of both of the "X" coils produces a balanced flux in the "X" group of sealed switch units so that these switch units restore to their normal condition and, in doing so, interrupt the connection between the source of latching potential and the single coil in each of the "X" and "Y" windings. Since the coupling diode in the "Y" winding prevents the energization of the second coil in this winding, the "Y" group of sealed switch units remain operated until the reset pulse is terminated. At that time, the energization of all of the coils in the control module is terminated, and the "Y" group of sealed switches are restored to a normal condition.

This control module provides an electrical memory in the sense that the retention of the control module in a set or operated condition is dependent upon the continuity of the latching potential. This module can be modified by the provision of a biasing magnet adjacent the latching switch in the "X" group of magnetic sealed switch units to provide means for maintaining this latching switch in a closed condition when latching potental is removed. Thus, when the latching potential is removed and then restored to the module, the module returns to its prior state. The basic configuration of the control module can also be modified to provide a single input module or flip-flop using the transfer contacts provided by one pair of the mangetic sealed switch units in the "Y" switch group to alternately apply input pulses from a single source to the reset and set terminals of the module. In a further modification of the control module, one of the coils in the "X" winding is removed so that the module is set or operated by the application of an input signal to the set terminal and is reset by interrupting the source of latching potential at a point external to the module. The number and closed or open state of the sealed switches in the "X" and "Y" groups can also be varied in accordance with design requirements.

The different forms of the control module provide a bit storage means which is operated to set or bit storing condition by the application of a single to the input terminal and which is restored to a normal or reset condition by the application of a single to the reset terminal or by the interruption of the latching potential supply. A plurality of these control modules can be interconnected in an ordered series or sequence to provide binary or decimal counters, shift registers, ring counters or bidirectional counters by the selective interconnection of the set, reset and latching terminals of the modules through the "Y" groups of magnetic sealed switch units therein. In general, the selective generation of unbalanced magnetic flux fields in the modules of the counting and register circuits advances the signal count or registers a data bit, and the selective generation of balanced magnetic flux fields clears or resets the register or counting stages provided by the modules.

Many other objects and advantages of the present invention will become apparent from considering the following detailed description in conjunction with the drawings, in which.

Figure 1:
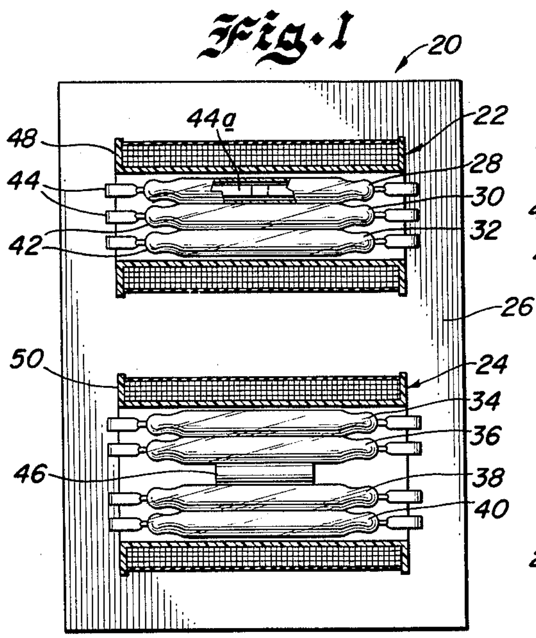
FIG. 1 is a plan view in partial section of the construction of an electrical memory control module forming one embodiment of the present invention.
Figures 3, 4:
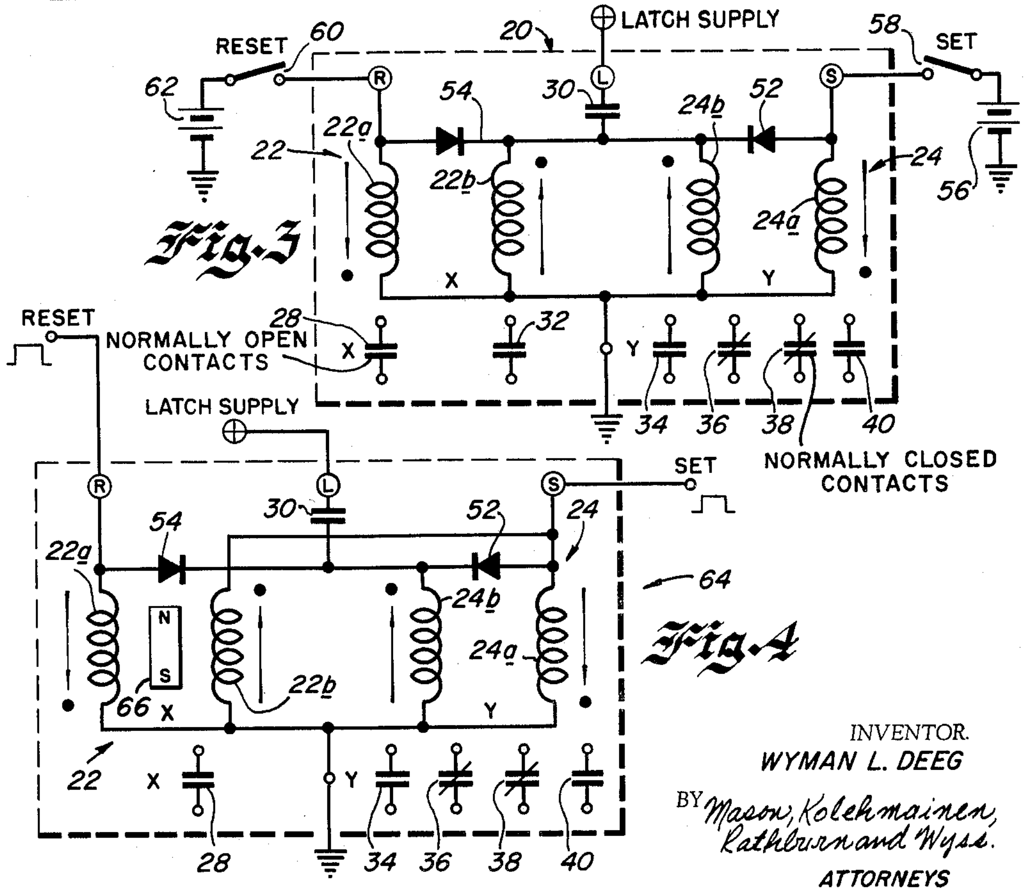
FIG. 3 is a schematic diagram of the control module shown in FIG. 1.
FIG. 4 is a schematic diagram of the control module shown in FIG. 2.

Referring now more specifically to FIGS. 1 and 3 of the drawings, therein is illustrated a control module 20 which embodies the present invention and which includes a first or "X" winding means 22 and a second or "Y" winding means 24 mounted on a supporting member 26. The "X" winding means 22 controls the selective operation of an "X" group of sealed magnetic switches 28, 30 and 32, and the "Y" winding means controls the operation of a "Y" group of sealed magnetic switches 34, 36, 38 and 40. The switch units 28, 30, 32, 34, 36, 38 and 40 can be of any of the well known "wet" or "dry" contact types and are illustrated as comprising reed relays having an elongated glass or dielectric envelope or housing 42 in the opposite ends of which a pair of magnetic reeds 44 are sealed. The inner ends 44*a* of the magnetic elements or reeds 44 overlap and are normally spaced from each other so that the switch units normally provide open contacts. When a magnetic flux field of a given magnitude or unit strength of either polarity is applied to the magnetic members 44, the inner ends 44*a* thereof are moved into engagement to complete an electrically conductive circuit through the switch unit. The reeds 44 can be retained in engagement by the application of a magnetic field of either polarity having a strength on the order of one-half of that required to move these reeds from a spaced position to an engaged position.

In the normal condition of the module 20, the three sealed switch units 28, 30, and 32 forming the "X" group of contacts or switches are in an open condition as illustrated in the schematic diagram in FIG. 3. In the "Y" group of sealed switch units including the units 34, 36, 38, and 40, a permanent biasing magnet 46 is disposed immediately adjacent the switch units 36 and 38 and is of a sufficient strength to close the reeds 44 in the switch units 36 and 38 to an engaged position. Thus, as illustrated in the schematic diagram in FIG. 3, the switch units 34 and 40 are in an open condition and the switch units 36 and 38 are in a closed condition in the normal or reset condition of the module 20.

The "X" winding means 22 includes a bobbin 48 (FIG. 1) on which a pair of coils 22*a* and 22*b* (FIG. 3) are wound. When energized, the coils 22*a* and 22*b* provide magnetic flux fields of approximately equal strength and opposite polarity. The winding means 24 includes a bobbin 50 (FIG. 1) on which a pair of coils 24*a* and 24*b* (FIG. 3) are wound. When energized, the coils 24*a* and 24*b* provide magnetic flux fields of substantially equal strength and opposite polarity. The polarity of the field generated by the coil 24*b* is opposite to the polarity of the field provided by the permanent magnet 46, and the polarity of the field generated by the coil 24*a* is the same as that of the magnet 46.

The winding means 22 and 24 and the sealed switch units 28, 30, 32, 34, 36, 38, and 40 are mounted on the supporting panel 26 in any suitable manner. Preferably, the supporting member 26 comprises a printed circuit panel, and the winding means and sealed switch units are physically mounted on the panel and the electrical connections made to the components in the manner disclosed in United States Patent No. 3,038,976 or in the copending applications of Robert D. Zielinski, Serial No. 151,319, filed November 9, 1961, and Arthur J. Koda et al., Serial No. 151,269, filed November 9, 1961, now Patent No. 3,114,080. If desired, one or both surfaces of the supporting member 26 can be covered with a thin and flexible dielectric covering in the manner disclosed in detail in the copending application of Arthur J. Koda, Serial No. 843,448, filed October 23, 1959, now Patent No. 3,114,807. The use of the constructions shown in these patents and applications permits the control modules 20 to be manufactured with modern electronic techniques and provides a small and easily installed and replaced module unit.

Referring now more specifically to FIGURE 3 of the drawings, therein is illustrated a schematic diagram of the control module 20. One terminal of each of the coils 22*a*, 22*b*, 24*a* and 24*b* is connected to a source of reference potential, such as ground, and the remaining terminal of the coil 24*a* is connected to a set or input terminal "S." This terminal is connected through a coupling diode 52 in the "Y" winding means 24 to the remaining terminals of the coils 22*b* and 24*b*. The other terminal of the coil 22*a* is connected to a reset terminal "R," and this terminal is also connected through a coupling diode 54 in the "X" winding means 22 to one terminal of the coil 22*b* and one terminal of the coil 24*b*. The normally open contacts provided by the sealed switch 30 in the "X" group are connected between a source of latching potential and the terminals of the coils 22*b* and 24*b*. The remaining normally open switches 28 and 32 in the "X" group, the normally open "Y" group contacts or switches 34 and 40, and the normally closed "Y" group contacts or switches 36 and 38 are illustrated schematically in FIG. 3 and provide completely isolated individual outputs from the control module 20.

When the control module 20 is to be operated from its normal or reset condition to an operated or set condition, a positive-going input pulse or signal is applied to the set terminal "S." In FIG. 3, the pulse or signal source is illustrated schematically as comprising a grounded battery 56 and a switch 58. However, any suitable switching or controlled conduction means, such as a solid state device, can be used. When the switch 58 is closed, the coil 24*a* in the "Y" winding means 24 is directly energized, and the coil 24*b* is energized through the diode 52 so that substantially equal and oppositely directed or balanced flux fields are generated in the magnetic elements 44 in the four "Y" group sealed switches 34, 36, 38 and 40 by the winding means 24. Since the magnet 46 still holds the switches 36 and 38 closed, all four of the "Y" group switch units remain in their normal condition. However, the coil 22*b* in the "X" winding means 22 is also energized through the diode 52 to generate an unbalanced flux of a sufficient strength to operate the switches 28, 30, and 32. When the sealed switch unit 30 is actuated, a positive potential from the latching supply is forwarded through the closed contacts provided by the switch 30 to maintain the energized condition of the coils 22*b* and 24*b*. The latching supply potential is of the same polarity and magnitude as the signal supplied to the set terminal.

When the switch 58 is opened to terminate the input or set pulse, the coils 22*b* and 24*b* remain energized through the operated switch 30, and the coil 24*a* is no longer energized. This shifts the flux supplied to the magnetic elements 44 in the sealed switches 34, 36, 38, and 40 from a balanced condition to an unbalanced condition in which the flux field provided by the coil 24*b* closes the switches 32 and 40 and opposes that of the magnet 46 to open the switches 36 and 38. The control module 20 remains in this condition with the "X" and "Y" groups of contacts or switches actuated until such time as the module 20 is reset by applying a signal to the reset terminal or by disconnecting the latching potential from the closed contacts 30.

When the control module 20 is to be reset or returned to its normal condition, a switch 60 is momentarily closed to connect a battery 62 to the reset terminal "R" so that the coil 22*a* in the "X" winding means 22 is directly energized and the coils 22*b* and 24*b* are energized through the diode 54. Since both of the coils 22*a* and 22*b* in the "X" winding means 22 are energized, a balanced flux field consisting of equal fields of opposite polarities is applied to the magnetic elements 44 in the sealed switch units 28, 30, and 32. This restores these switch units to a normal condition and disconnects the latching potential from the coils 22*b* and 24*b*. Since only the coil 24*b* in the winding means 24 is energized by the battery 62, the "Y" group of sealed switches remains operated. However, when the switch 60 is opened, the "X" winding means 22 and the "Y" winding means 24 are not energized, and the sealed switches 34, 36, 38, and 40 in the "Y" group are restored to their normal condition. The module 20 can also be reset by momentarily removing the latching potential to release all of the "X" and "Y" group switches. When the latching potential is reapplied, the contacts provided by the switch 30 are open, and the module 20 is not returned to a set condition.

Figure 2:
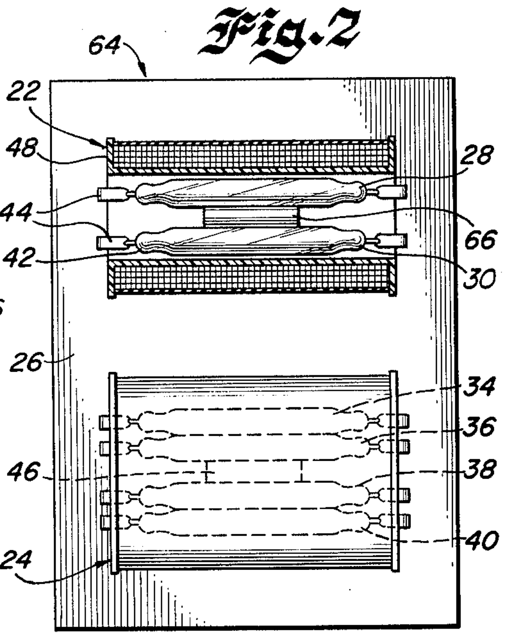
FIG. 2 is a plan view in partial section of the construction of a magnetic memory control module forming another embodiment of the invention.

FIGURES 2 and 4 illustrate a magnetic memory control module 64 that is substantially identical to the control module 20. The control module 64 includes the "X" winding means 22 and the "Y" winding means 24 mounted on the supporting panel 26. The "Y" group of sealed switch units controlled by the "Y" winding means 24 is identical to the "Y" group of sealed switches provided in the module 20 and includes the four sealed switch units 34, 36, 38 and 40. However, the "X" group of sealed switch units in the magnetic memory control module 64 includes only the sealed switch units 28 and 30. The space within the "X" winding means 22 in the module 64 occupied by the sealed switch unit 32 in the control module 20 contains a permanent magnet 66 disposed immediately adjacent the sealed switch 30. This magnet provides a biasing flux having a strength on the order of one-half of that provided by either of the coils 22*a* or 22*b* and having a polarity that is the same as that of the coil 22*b* and opposite to that generated by the coil 22*a*. Thus, the flux field provided by the permanent magnet 66 is not sufficient to move the magnetic members 44 in the sealed switches 28 and 30 into engagement but is sufficient to hold these members in engagement after they have been closed.

Referring now more specifically to FIGURE 4 of the drawings, the circuitry of the control module 64 is identical to that of the module 20 shown in FIG. 3 except that the terminal of the coil 22*b* in the "X" winding means 22 is connected directly to the set terminal "S" rather than indirectly through the coupling diode 52 in the "Y" winding means 24. Thus, the coil 22*b* also is not connected to the contacts 30 and cannot be connected to the source of latching potential or to the reset terminal "R."

When a positive-going input pulse is applied to the set terminal, both of the coils 24*a* and 24*b* in the "Y" winding means 24 are energized to provide a balanced flux, and the "Y" group of sealed switch units 34, 36, 38, and 40 are not operated. The winding 22*b* is directly energized to provide a flux field aiding the flux field provided by the permanent magnet 66, and the energization of the coil 22*a* is blocked by the diode 54. Thus, the sealed switch units 28 and 30 in the "X" group are operated so that the winding 24*b* is energized from the source of latching potential. When the input signal is removed from the set terminal, the energization of the coil 24*a* is terminated, and the coil 24*b* remains energized through the closed switch 30 so that the sealed switch units 34, 36, 38, and 40 in the "Y" group are operated. The termination of the energization of the coil 22*b* does not release the sealed switch units 28 and 30 because these switches are maintained in a closed condition by the permanent magnet 66.

When the control module 64 is to be reset to a normal condition, a positive-going signal is applied to the reset terminal to energize the coil 22*a* and is forwarded through the diode 54 to maintain the energization of the coil 24*b*. Since the coil 22*b* in the "X" winding 22 is not energized, the field provided by the energized coil 22*a* opposes the smaller field provided by the permanent magnet 66 so that the sealed switch units 28 and 30 are opened. The opening of the contacts 30 removes the holding potential from the coil 24*b*. Thus, when the reset signal is removed to terminate the energization of the coils 22*a* and 24*b*, the sealed switches 34, 36, 38, and 40 in the "Y" group return to their normal condition.

Figures 5, 6, 7:
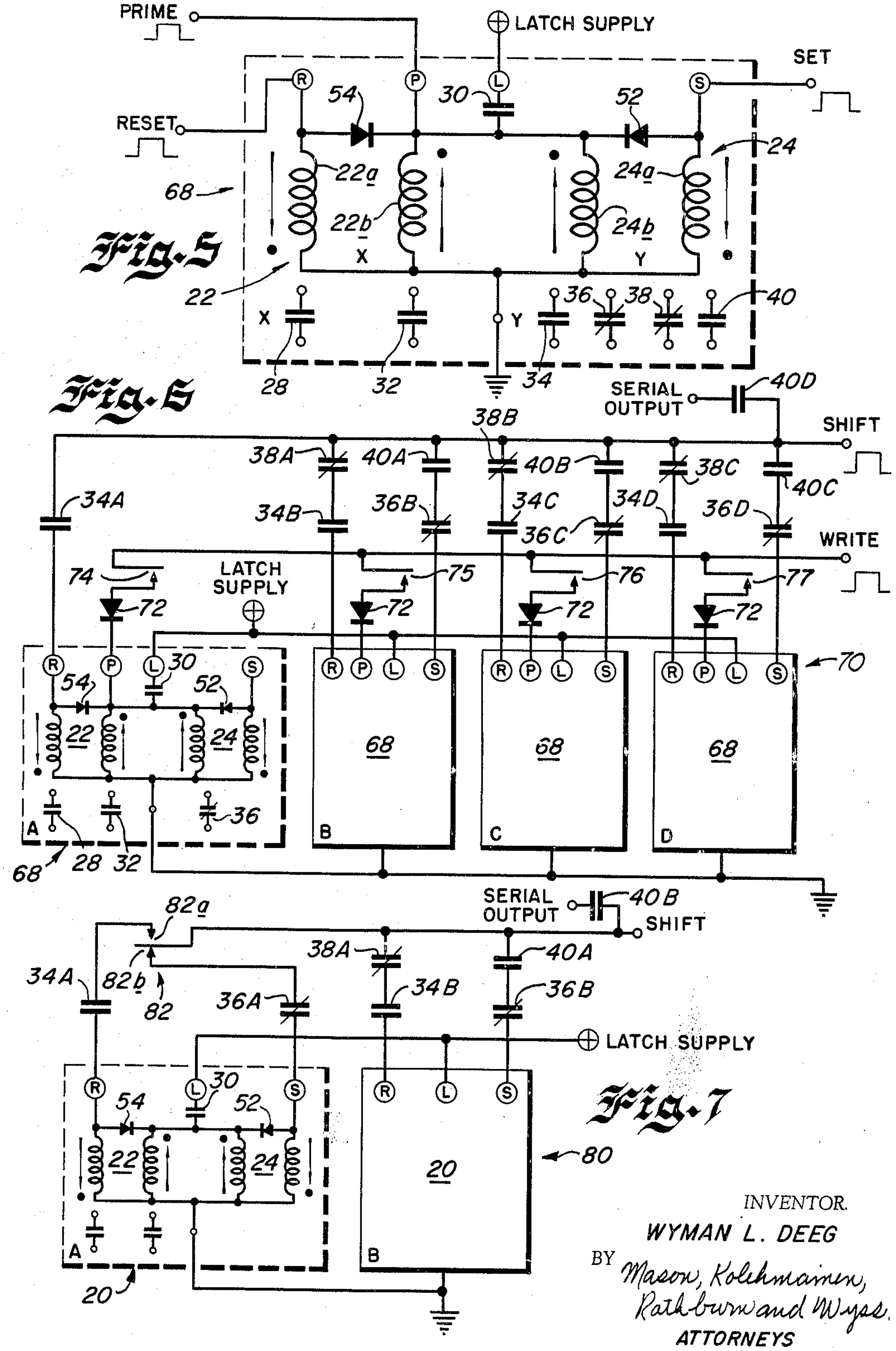
FIG. 5 is a schematic diagram of a modification of the control module shown in FIG. 3 used in a shift register.
FIG. 6 is a schematic diagram of a shift register using a plurality of the control modules shown in FIG. 5.
FIG. 7 is a schematic diagram of another shift register using a plurality of the control modules shown in FIG. 5.

FIGURE 5 of the drawings illustrates a control module 68 that is substantially identical to the control module 20 with the exception that a priming or direct input terminal "P" is provided. This priming terminal is connected directly to the terminals of the coils 22*b* and 24*b* in the "X" and "Y" winding means 22 and 24. When a positive-going pulse or signal is applied to the terminal "P," both of the coils 22_b_ and 24_b_ are energized so that all of the "X" and "Y" group sealed switch units in the module 68 are actuated. The operation of the sealed switch 30 connects the coils 22_b_ and 24_b_ to the latching potential supply to hold the module 68 in a set condition when the prime signal is removed from the terminal "P." In all other respects, the construction, circuitry, and operation of the control module 68 are identical to those of the control module 20. The magnetic memory module 64 can also be provided with a priming or direct input by connecting the priming terminal "P" to the input terminals of each of the coils 22_b_ and 24_b_ through an individual blocking diode.

FIGURE 6 of the drawings illustrates a shift register 70 having a parallel input and a parallel and serial output. The shift register 70 utilizes the control module 68 for each bit in the input word or entry. The shift register 70 illustrated in FIG. 6 includes four control modules 68 identified as "A," "B," "C" and "D" for receiving and storing an entered four bit word. A greater or lesser number of the modules 68 can be used in accordance with the desired storage capacity.

To provide means for entering a four bit word in parallel into the shift register 70, the priming terminals of the four control modules 68 are each connected through a blocking diode 72 to one of four manually operated switches 74–77. The other terminal of each of the switches 74–77 is connected to a common write signal input. The four switches 74–77 are manually actuated in accordance with the word that is to be entered into the shift register 70, although other suitable controlled conduction devices can be used in place of the switches 74–77. Assuming that a binary word "1000" is to be entered into the register 70, the switch 74 is closed and the switches 75–77 are left in an open condition. When a positive-going write pulse or signal is applied to the write terminal, it is coupled through only the closed switch 74 and the connected diode 72 to energize the coils 22_b_ and 24_b_ in the "A" control module 64 so that the sealed switches 28, 30, 32, 34, 36, 38, and 40 are actuated. The closure of the contacts 30 in the "A" control module 68 completes a holding circuit for the coils 22_b_ and 24_b_ so that the "X" and "Y" groups of sealed switch units in the "A" control module 68 remain in their operated condition when the write signal terminates. The operated switches 28 and 32 can be used to provide an output from the "A" control module 68 indicating the storage of the bit "1" in this module. Since the "B," "C", and "D" control modules 68 remain in their normal or reset position, the corresponding sealed switches in the "X" and "Y" groups in these modules are not actuated to indicate that these modules are storing the bits "0." Thus, the operated condition of the "A" module 68 and the reset condition of the "B," "C," and "D" modules 68 store the word "1000."

The "Y" groups of sealed switch units in the "A," "B," "C" and "D" control modules 68 selectively interconnect the set and reset terminals of the modules 68 with a common shift pulse source so that these four modules 68 operate as a shift register. In the contact networks illustrated in FIG. 6 and others of the drawings, each pair of contacts provided by the "Y" group sealed switch units in a control module is designated by the numerical reference number of the corresponding switch followed by an alphabetical character representing the module in which the sealed switch is located. As an example, the reset terminal of the "A" control module 68 is connected to the shift pulse input terminal through a normally open pair of contacts 34A provided by the sealed switch unit 34 in the "A" control module 68. As a further example, the shift register 70 includes means for providing a serial pulse output as the entry is shifted, and this output is provided by the normally open contacts of the sealed switch 40 in the "D" control module 68. These contacts, which are positioned adjacent the serial output terminal in FIG. 6, are designated "40D."

As described above, the priming of the shift register 70 results with the setting of the "A" control module 60 and the retention of the "B," "C," and "D" control modules 68 in a reset position representing the entry "1000." When the "A" control module 68 is set, the contacts 34A are closed to connect the reset terminal of the "A" module 68 to the shift pulse source. The contacts 38A are opened to disconnect the shift pulse source from the reset terminal of the "B" control module 68, and the contacts 40A are closed to connect the shift pulse source to the set terminal of the "B" control module 68. The remaining control modules are disconnected from the shift pulse source.

When the first positive-going shift pulse is generated, it is applied through the closed contacts 40A and 36B to the set terminal of the "B" control module 68 and through the closed contacts 34A to the reset terminal of the "A" control module 68. In the "A" control module 68, both coils of the "X" winding 22 are energized to release the sealed switches 28, 30, and 32 in this module. However, the "Y" group of sealed switch units remain operated until the shift pulse has terminated. The positive-going shift pulse applied to the set terminal of the "B" control module 68 energizes both coils of the "Y" winding 24 and only one coil of the "X" winding 22 so that the "X" group sealed switch units 28, 30, and 32 in the "B" control module 68 are operated. The contacts provided by the switch unit 30 in the "B" module 68 connect this module to the latching potential. Therefore, when the shift pulse is terminated, the "A" control module 68 restores to a normal or reset position and the "Y" group of switches in the "B" module 68 are operated to place this module in a set condition. Thus, the shift register 70 is now in a condition in which only the "B" control module 68 is in a set condition to represent the entry "0100" in which the input word entry has been shifted one position to the right. The serial output terminal does not receive a signal inasmuch as a bit "0" was stored in the "D" control module 68, and this module is in a reset condition so that the contacts 40D are not closed to permit the shift pulse to be transmitted to the serial output terminal.

When the "A" control module 68 is reset, the contacts 34A and 40A are opened, and the contacts 38A are closed. The closure of the contacts 38A prepares a circuit in series with the closed contacts 34B for resetting the "B" control module 68 when the next shift pulse appears. The opening of the contacts 40A prevents the application of the next shift pulse to the set terminal of the "B" control module 68, and the opening of the contacts 34A prevents the application of the next shift pulse of the reset terminal of the "A" control module 68. When the "B" control module 68 is set, the contacts 34B are closed to complete the path for applying the next shift pulse to the reset terminal of the "B" control module 68, the contacts 36B are opened to interrupt an additional point in the circuit for applying the shift pulse to the set terminal of the "B" control module 68, the contacts 38B are opened to interrupt one point in a circuit for applying the shift pulse to the reset terminal of the "C" control module 68, and the contacts 40B are closed to complete a path for applying the next shift pulse to the set terminal of the "C" control module 68.

Thus, when a given one of the modules 68 is in a set condition storing the bit "1," the sealed switches in the "Y" contact group therein prepare a circuit for applying the next shift pulse to the reset terminal of the given module, this path being interrupted if the next lowest order control module 68 is in a set condition indicating that a bit "1" is to be transferred into the given module during the next shift cycle. In addition, the setting of one of the control modules prepares an operating path for the next highest order control module 68 and interrupts the reset path to the next highest order module so that the set condition of the lower order of modules can be transferred to the higher order of modules during the next shift cycle.

With the shift register 70 in a condition in which only the "B" module 68 is in a set condition representing the entry "0100," the next shift pulse is forwarded through the closed contacts 40B and 36C to set the "C" module 68. This pulse is also forwarded through the closed contacts 38A and 34B to reset the "B" control module 68. Since the "D" or output module 68 still is not in a set condition, the shift pulse is not transferred through the open contacts 40D to the serial output, and the first two shift pulses result in the transmission of "00" to the serial output. The shift register 70 now stands in a condition representing the entry "0010."

In the manner described above, the setting of the "C" control module 68 prepares a path for resetting the "C" molude 68 and for operating the "D" module 68 on the next shift pulse. Accordingly, when the next shift pulse is provided, the "C" module 68 is reset and the "D" module 68 is set to store "0001." Since the contacts 40D remain in an open condition, the pulses transmitted to the serial output represent "000." When the next shift pulse appears, this pulse is transmitted through the closed contacts 40D to the serial output so that the serial output provided by the shift register now represents "0001." This shift pulse also resets the "D" module 68 so that the shift register 70 is reset to a normal condition representing "0000." The shift register 70 can be cleared at any time to a normal condition representing "0000" by interrupting the latching supply potential for the four control modules 68. The shift register 70 can also be modified to circulate the initial entry by connecting the contacts 38D in series with the contacts 34A and by connecting the set terminal of the "A" module 68 to the shift pulse source through the contacts 36A and a pair of normally open contacts provided by an additional "Y" group switch in the "D" module 68.

The control modules 20, 64, and 68 can also be used to provide a shift register having a serial input with parallel and serial outputs. FIGURE 7 of the drawings illustrates a register 80 which is substantially identical to the shift register 70 except for modifications in the lowest order stage to provide for serial bit input and which utilizes the control modules 20 rather than the control modules 68. The shift register 80 could also be constructed using the control modules 64 and 68 in place of the control modules 20.

As illustrated, the shift register 80 comprises two stages formed by two control modules 20 identified as "A" and "B" which are connected in the same manner as the modules 68 in the shift register 70, the last or "B" control module 20 providing a serial output through the pair of normally open contacts 40B provided by the sealed switch unit 40. To provide means for supplying signals representing the bits "0" and "1" to the input or "A" control module 20, the shift register 80 includes an input signaling means shown as comprising a switch 82 having two pairs of contacts 82*a* and 82*b*. The contacts 82*a* are connected to the reset terminal of the "A" control module 20 through the normally open contacts 34A and the contacts 82*b* are connected to the set terminal of the "A" control module 20 through the pair of normally closed contacts 36A. The switch 82 is connected to the shift terminal to receive positive-going shift signals or pulses and is operated to close the contacts 82*a* when the bit "0" is to be entered and to close the contacts 82*b* when the bit "1" is to be entered.

Assuming that the shift register 80 is in a normal condition in which the two stages provided by the "A" and "B" control modules 20 are in a reset condition and that the word "01" is to be entered, the switch 82 is operated to close the contacts 82*b*. When a positive-going pulse is applied to the shift terminal, this signal is forwarded through the closed contacts 82*b* and 36A to the set terminal of the control module 20. When this pulse terminates, the "Y" group sealed switch units in the "A" control module 20 are operated to open the contacts 36A and 38A and to close the contacts 34A and 40A. The opening of the contacts 36A and 38A interrupts the path extending to the set terminal of the "A" control module 20 and reset terminal of the "B" control module 20. The closure of the contacts 40A completes the path for applying the next shift pulse to the set input of the "B" control module 20, and the closure of the contacts 34A prepares the path for applying a subsequent shift pulse to the reset terminal of the "A" control module 20. Thus, the operated condition of the "A" control module 20 and the reset condition of the "B" control module 20 provides a representation of "10."

Since the next bit to be entered into the shift register "A" is the bit "0," the switch 82 is operated to open the contacts 82*b* and to close the contacts 82*a*. The next shift pulse is forwarded through the closed contacts 34A to reset the "A" control module 20 and through the closed contacts 40A and 36B to set the "B" control module 20. The shift register 80 has now completed the storage of the entry "01" represented by the reset condition of the "A" control module 20 and the set condition of the "B" control module 20. A completely isolated parallel output representing the serially entered word in the shift register 80 is provided by the sealed switches 28 and 32 in the modules 20.

To provide a serial output from the shift register 80, the input control switch 82 is actuated to a setting in which the contacts 82*a* are closed, and shift pulses are again supplied to the shift terminal. Since the "B" control module 20 is in a set condition, the contacts 40B are closed, and the first shift pulse is transmitted to the serial output terminal and to the reset terminal of the "B" control module 20, thereby resetting this module. The next shift pulse is not transmitted to the serial output terminal inasmuch as the "B" control module 20 is in a reset or normal condition. Thus, the serial output terminal receives signals representing "01" or the shifted word previously stored in the shift register 80.

Thus, the shift register 80 provides means for serially entering a word and for obtaining either a parallel or a series output. Although the shift register illustrated in FIG. 7 includes only two stages formed by the "A" and "B" control modules 20, the capacity of this register can be varied by adding additional modules in the manner illustrated in FIG. 6 in accordance with the maximum length of the words to be entered. The illustrated shift register 80 using the electrical memory control module 20 is reset to a normal condition in which the stored information is lost in the event that the latching supply potential is momentarily removed. However, if the magnetic memory control modules 64 are used in place of the modules 20, the data stored in the shift register 80 is not lost when all potential is removed from the network. When the operating potential is returned, the magnetically latched contacts 30 in the previously set ones of the modules 64 cause the selective energization of these modules to restore the previous pattern of set and reset conditions.

Figure 8:
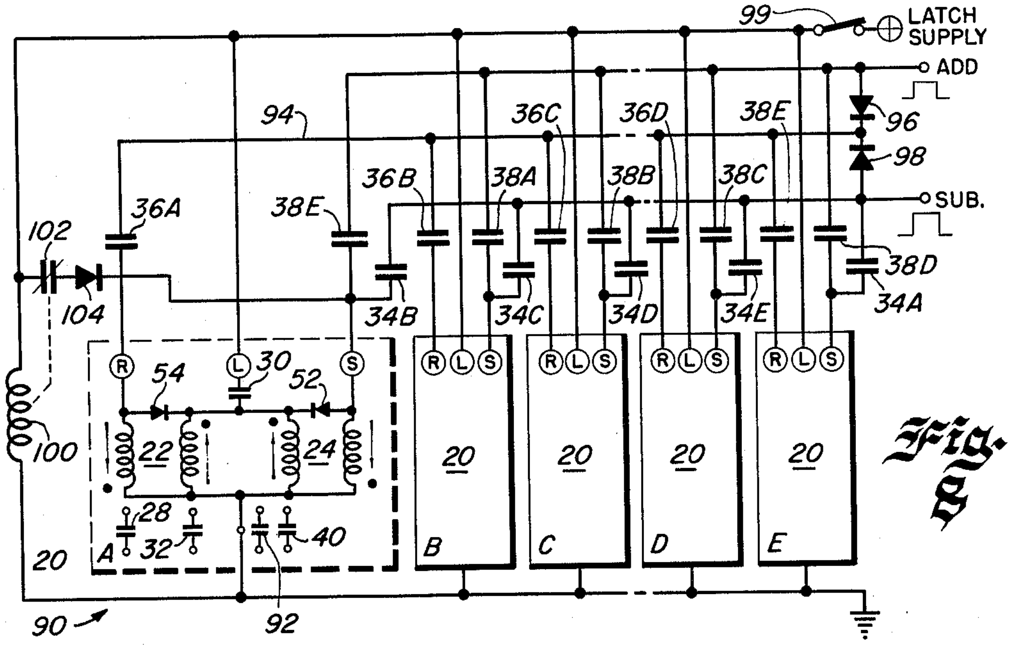
FIG. 8 is a schematic diagram of a bidirectional ring counter using the control module shown in FIG. 3.

The control modules 20 can also be interconnected to provide a bidirectional ring counter 90 illustrated in FIG. 8. The control modules 20 used in the ring counter 90 are the same as those illustrated in FIGS. 1 and 3 of the drawings except that the permanent magnet 35 for normally biasing the sealed switches 36 and 38 to a closed condition is removed so that the contacts provided by the switches 36 and 38 are normally in an open condition. If desired, an additional sealed switch unit can be inserted within the "Y" winding means 24 in place of the permanent magnet 46 to provide an additional pair of contacts shown schematically as 92 in FIG. 8 of the drawings.

The counter 90 is illustrated as comprising five counting stages formed by five control modules 20 identified as "A–E." The control modules 20 forming the bidirectional counter 90 are interconnected with each other and with an add input terminal, a subtract input terminal, and a reset terminal by the contacts provided by the "Y" groups of sealed switches. More specifically, the reset terminal of each control module 20 is connected to a common reset line 94 by the normally open switch 36 in each module, and the set terminal of each module is connected to the add input by the sealed switch 38 in the next lowest order control module 20 and to the subtract input by the sealed switch 34 in the next highest order control module 20. The add pulse terminal is coupled to the reset line 94 by a diode 96, and the subtract input is coupled to the common reset line 94 by a diode 98. The sealed switch 30 in each module 20 is connected to the latching potential supply through a switch 99. The unused sealed switches 28 and 32 in the "X" group and the unused sealed switches 40 and 92 in the "Y" group provide isolated outputs from each stage of the bidirectional counter 90.

When the counter 90 is to be placed in operation, the switch 99 is closed to apply a positive potential to the open latching circuits and to prime the lowest order or first control module 90 to a set condition. The priming or zero setting operation is controlled by a relay having both an operating winding 100 which is connected to the latch supply potential by the switch 99 and a pair of normally closed contacts 102 which apply the latch supply potential to the set terminal of the "A" control module 20 through a diode 104. When the switch 99 is first closed, the set terminal of the "A" control module 20 is energized so that the "X" group of sealed switches 28, 30, and 32 in the "A" module 20 are operated. The potential supplied through the switch 99 also energizes the winding 100 so that the contacts 102 are opened to terminate the application of the positive potential to the set terminal of the "A" control module 20. This operates this module to a set condition so that the contacts 34A, 36A, and 38A are closed. The closure of the contacts 36A connects the reset terminal of the "A" control module 20 to the common reset line 94, and the closure of the contacts 34A connects the subtract terminal to the set input of the adjacent lower order or "E" control module 20. The closure of the contacts 38A connects the set terminal of the adjacent higher order "B" control module 20 to the add terminal.

If the counter 90 is to be advanced in a positive direction, a positive-going pulse is applied to the add terminal which is forwarded through the diode 96 and the closed contacts 36A to reset the "A" control module 20 to its reset or normal condition. The positive-going pulse applied to the add terminal is also forwarded through the closed contacts 38A to the set terminal of the "B" control module 20 so that at the termination of this pulse, the "B" control module 20 is in a set condition and the remaining modules in the counter 90 are in a reset condition. When the "A" control module 20 is reset, the contacts 34A, 36A, and 38A are open, and when the "B" control module is set, the contacts 34B, 36B and 38B are closed. The closure of the contacts 34B connects the subtract pulse terminal to the set input of the next lowest order or "A" control module 20, and the closure of the contacts 38B connects the set terminal of the next highest order or "C" control module 20 to the add input terminal. The closure of the contacts 36B connects the reset terminal of the "B" control module to the common reset line 94.

Assuming that a positive-going subtract pulse is now applied to the subtract input terminal, this pulse is forwarded through the closed contacts 34B to the set terminal of the "A" control module 20. This pulse is also coupled through the diode 98 to the common reset line 94 and from this line through the closed contacts 36B to the reset terminal of the "B" control module 20. At the termination of the positive-going subtract pulse, the "B" control module 20 is reset and the "A" control module is set. Thus, the counter 90 has been operated in a single step in a negative or reverse direction in response to the application of a pulse to the subtract input. In this manner, the counter 90 can be advanced to any setting in dependence on the combination of input signals applied to the add input terminal and the subtract input terminal. The counter 90 can be cleared to a normal condition by momentarily opening the switch 99.

The bidirectional counter 90 using the electrical memory control modules 20 loses the information stored therein and is reset to a normal condition in which only the "A" control module 20 is set whenever the supply of latching potential is momentarily interrupted. To avoid this loss of information, the bidirectional counter 20 can be constructed using the magnetic memory control modules 64 so that any item of information stored in the counter 90 when the latching supply is interrupted is automatically primed into this counter when the latching supply is restored. The magnetic memory control modules 64 prevent the loss of the stored information because the bias magnets 66 (FIGS. 2 and 4) maintain the contacts 30 that were closed when the power fails in closed positions during the power outage. When the power latching supply potential is returned, it is directly supplied to the windings 24*b* in the previously set modules 64 to reoperate the "Y" groups of sealed switches in those of the modules 64 that were previously in a set condition.

A bidirectional counter 105 (FIG. 9) using magnetic memory control modules 64 in place of electrical memory control modules 20 is the same as the counter 90 illustrated in FIG. 8 of the drawings except for a modification in the means provided for setting the counter 105 to its normal or zero position in which only the lowest order "A" control module 64 is in a set condition. When used in the counter 105, the module 64 is also modified in the same manner as the module 20 used in the counter 90 by removing the bias magnet 46.

A zero set terminal is connected to the common reset line 94 through a diode 106 (FIG. 9) and to the set terminal of the lowest order "A" control module 64 through an additional coupling diode 108. When a positive-going pulse is applied to the zero set terminal, this pulse is forwarded through the diode 106 to the reset line 94 to energize all of the coils 22*a* in all of the "X" winding means 22 in all of the set modules 64 in the circuit 105. As set forth above, the flux generated by the windings 22*a* opposes the holding bias provided by the permanent magnets 66 and restores all of the sealed switches 30 to a normal condition so that all of the control modules 64 are disconnected from the source of latching potential. The positive-going pulse provided at the zero set terminal is also forwarded through the diode 108 to the set terminal of the lowest order "A" control module 64. This produces a balanced flux in the "Y" winding means 24 so that the "Y" group of sealed switches are not operated and energizes only the coil 22*b* in the "X" winding means so that the "X" group of sealed switches are actuated. At the termination of the zero set pulse, the "Y" group of sealed switch units in the "A" control module 64 are actuated to place the "A" control module 64 in a set condition, the remaining control modules 64 being in a reset condition.

In the event that the "A" control module 64 is in a set condition at the time that the zero set operation is performed, the positive-going pulse provided by the diode 106 is also coupled through the closed contacts 36A to the reset terminal of the "A" control module 64. This would normally produce a flux opposing the flux provided by the permanent magnet 66 so as to release the latching contacts provided by the sealed switch 30. However, the concurrent energization of the coil 22*b* through the diode 108 substantially nullifies the flux generated by the coil 22*a*, and the permanent magnet 66 maintains the contacts provided by the sealed switch 30 in the "A" module 64 in a closed condition so that this module 64 remains in a set condition at the termination of the zero set signal.

Figure 10:
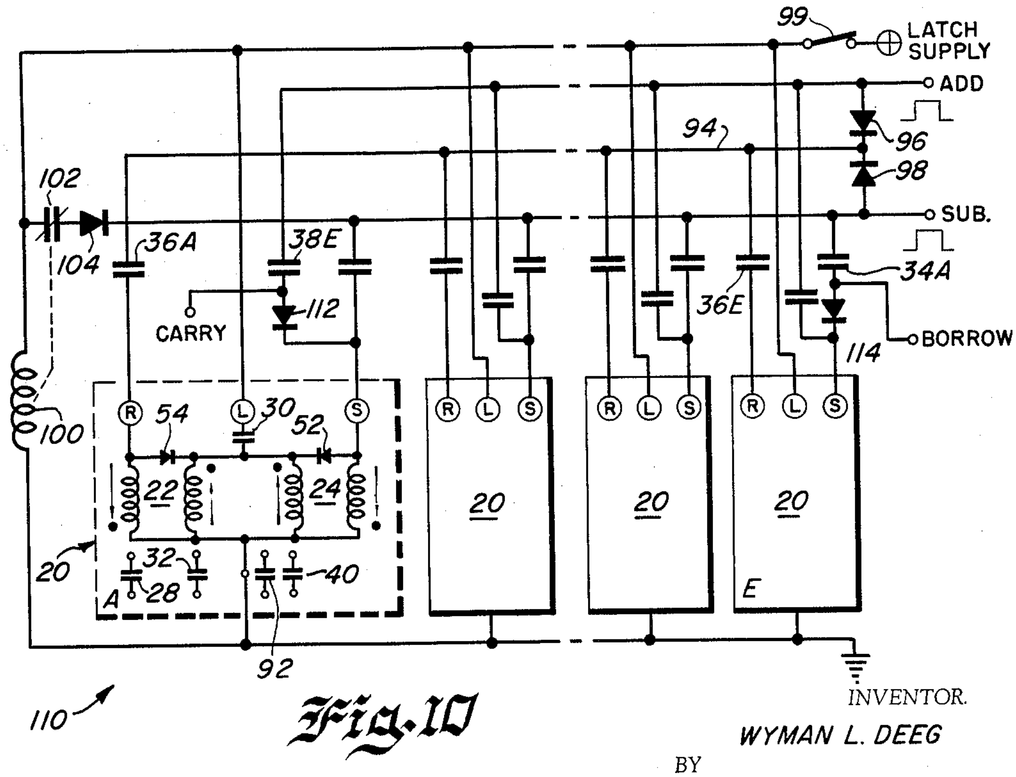
FIG. 10 is a schematic diagram of a decade counter using the control module shown in FIG. 3.

The bidirectional counter 90 illustrated in FIG. 8 of the drawings can be modified to provide a decade counter operable in forward and reverse directions and capable of supplying carry and borrow signals. A bidirectional decade counter 110 is illustrated in FIG. 10 of the drawings and is identical to the counting circuit 90 with the exception that the counter 110 is designed to count and store digits on a decimal basis and includes ten control modules 20 in each order, the first of which is designated as "A" and represents "0" and the last of which is designated as "E" and represents "9." Thus, the bidirectional counter 110 operates in the same general manner as the counter 90.

However, when the counter 110 is in a position representing the digit "9" in which the "E" control module 20 is in a set condition and the remainder of the control modules 20 are in a reset condition, the application of a positive-going pulse to the add terminal resets the "E" control module 20 over a path including the diode 96, the reset line 94, and the closed contacts 36E. This pulse is also forwarded through the closed contacts 38E to the carry terminal and through a diode 112 to the set terminal of the "A" control module 20. This sets the "A" control module 20 to represent "0." Thus, the counter 110 provides a carry output pulse each time that it advances from a "9" setting to a "0" setting. The diode 112 prevents the application of other signals from the set terminal of the "A" control module 20 to the carry output terminal.

Similarly, when the counter 110 is in a zero setting with only the "A" control module 20 in a set condition and an input pulse is applied to the subtract terminal, this pulse is forwarded through the diode 98 and the closed contacts 36A to reset the "A" control module 20 and is forwarded through the closed contacts 34A to a borrow output terminal. This pulse is also forwarded through a blocking diode 114 to the set terminal of the "E" control module to set this module so that the counter 110 is in a setting representing "9." The diode 114 prevents other signals applied to the set terminal of the "E" control module 20 from being transmitted to the borrow output terminal. Thus, whenever the counter 110 is operated in reverse direction from a setting representing "0" to a setting representing "9," a borrow output signal is provided.

Figures 9, 11:
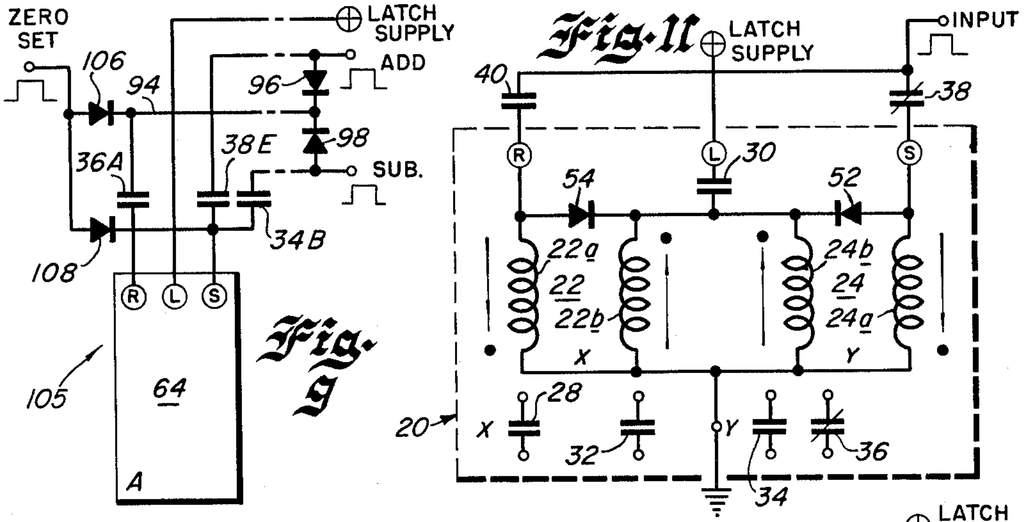
FIG. 9 is a schematic diagram illustrating a modification in the bidirectional ring counter shown in FIG. 8 using the magnetic memory control module shown in FIG. 4.
FIG. 11 is a schematic diagram of a modified form of the control module shown in FIG. 3 having a single input.

Some of the "Y" group of sealed switches 34, 36, 38, and 40 in the control modules 22 and 64 can be selectively connected to the set and reset terminals of these modules to provide a single input flip-flop device. FIGURE 11 of the drawings illustrates the control module 20 adapted for use as a single input device with the normally closed sealed switch 38 connected between the input terminal and the set terminal of the module and with the normally open sealed switch 40 connected between the input terminal and the reset terminal. In a similar manner, the magnetic memory control module 64 can be provided with a single signal input by the use of the normally closed sealed switch 38 and the normally opened sealed switch 40. In the circuit illustrated in FIG. 11, the first input signal applied to the input terminal is forwarded through the closed contacts 38 to operate the control module 20 to a set condition in which contacts provided by the seated switch 38 are open and the contacts provided by the sealed switch 40 are closed. Thus, the next pulse appearing at the input terminal is forwarded through the closed contacts 40 to the reset terminal of the module 20 so that the module is reset to its normal condition. This recloses the sealed switch 38 and opens the sealed switch 40 so that the following input pulse again sets the module 20.

Figure 12:
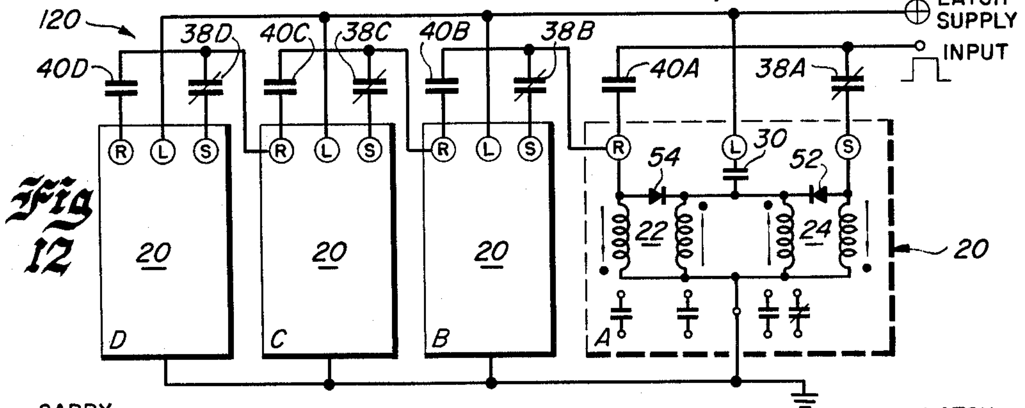
FIG. 12 is a schematic diagram of a binary counter using the control module shown in FIG. 11.

A binary counter 120 using four single input control modules or flip-flops 20 is illustrated in FIG. 12 of the drawings. The four control modules 20 are designated as "A–D" and represent the binary weights "1," "2," "4" and "8," respectively. The control modules 20 are connected in an ordered sequence or series by connecting the input terminal of the lowest order or "A" control module 20 to the source of input signals and by connecting the single input of each higher order control module 20 to the reset terminal of the next adjacent lower order module 20.

In operation, the first pulse applied to the input terminal sets the "A" control module 20 to open the contacts 38A and to close the contacts 40A. The next pulse applied to the input terminal is forwarded through the closed contacts 40A to reset the lowest order or "A" control module 20. This closes the contacts 38A and opens the contacts 40A. This second pulse is also forwarded from the reset terminal of the "A" control module 20 through the normally closed contact 38B on the second or "B" control module 20 to set this module. When the "B" control module is set, the contacts 38B are opened and the contacts 40B are closed. The third pulse applied to the input terminal only sets the "A" module 20 to open the contacts 38A and to close the contacts 40A. Thus, the "A" and "B" modules 20 in the counter 120 are now in a set condition representing "0011" or "3."

The fourth input pulse is forwarded through the closed contacts 40A, 40B, and 38C to set the "C" control module 20 and through the closed contacts 40A and 40B to reset the "A" and "B" modules. The setting of the counter 120 now represents "0100" or "4." In a similar manner, the remaining signals applied to the input terminal operate the counter 120 in normal binary progression so that the pattern of set and reset conditions in the four control modules 20 provides a representation in binary form of an entered digit or the total number of received pulses. The same counting or register circuit 120 can be provided using the magnetic memory control modules 64 in place of the control modules 20.

Figure 13:
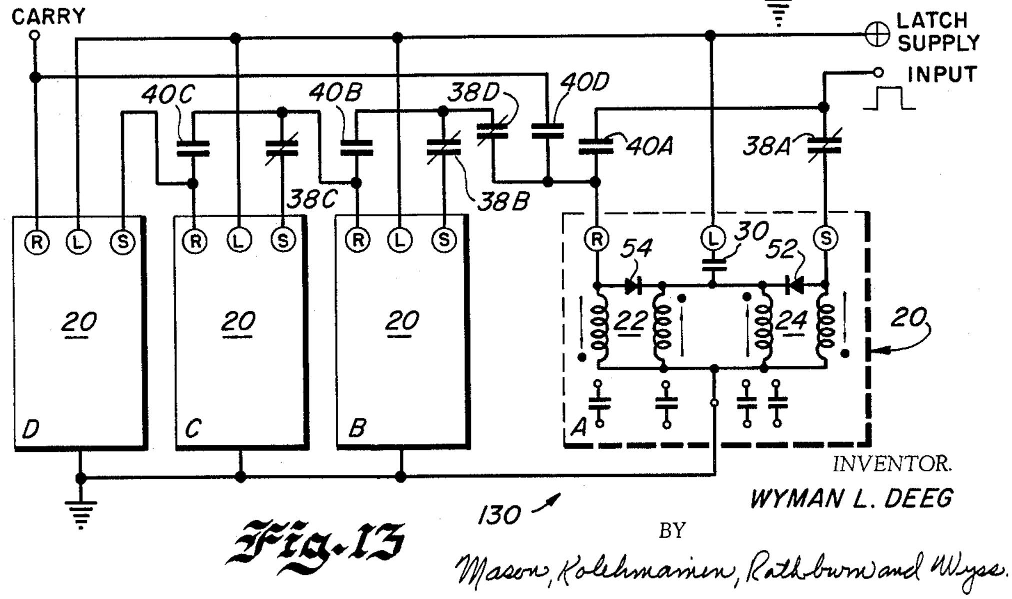
FIG. 13 is a schematic diagram of a binary coded decimal counter using the control module shown in FIG. 11.

A binary coded decimal counter 130 is illustrated in FIG. 13 of the drawings that is substantially identical to the binary counter 120 except that the normal binary counting progression has been modified so that the counter 130 is reset to a normal condition after ten input pulses have been counted. Means are also provided for supplying a carry output pulse at this time. More specifically, the counting circuit 120 is modified by connecting the normally closed contacts 38D provided by the sealed switch 38 in the "D" control module 20 between the reset terminal of the "A" control module and the common input to the "B" control module 20. Further, the reset terminal of the "A" or lowest order control module 20 is also connected to a carry output terminal and to the reset terminal of the highest order or "D" control module 20 through the normally open contacts 40D provided by the sealed switch 40 in the "D" control module 20.

The counting circuit 130 operates in substantially the same manner as the counting circuit 120 because of the fact that the contacts 38D are in a normally closed condition. When the eighth input pulse is received, the "A," "B" and "C" control modules 20 are reset, and the pulse at the reset terminal of the "C" control module 20 is directly applied to the set terminal of the "D" control module 20 to operate this module to its set condition. In operation, the "D" control module 20 opens the contacts 38D and closes the contacts 40D. When a ninth input pulse is received, the "A" control module 20 is operated to a set condition to close the contacts 40A and to open the contacts 38A. Thus, when the tenth input pulse is received, this pulse resets the "A" module 20 and is forwarded through the closed contacts 40A and 40D to the carry output terminal and to the reset terminal of the "D" control module 20. This resets the "D" control module 20 and returns the counter 130 to a normal zero representing condition. Although the counting circuit 130 is shown as including four control modules 20, it can be made in the identical manner using the magnetic memory control modules 64.

Figures 14, 16:
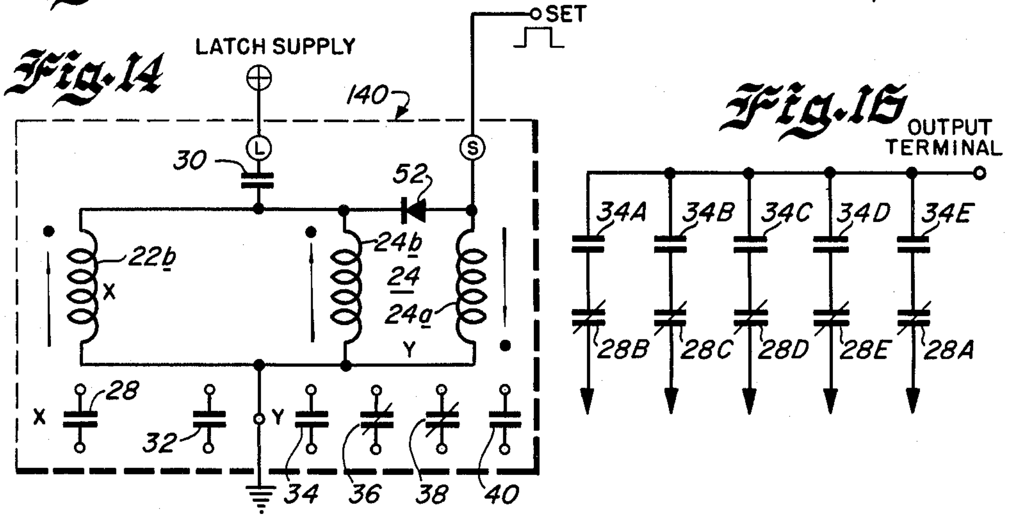
FIG. 14 is a schematic diagram of an additional form of the control module shown in FIG. 3.
FIG. 16 is a schematic diagram illustrating a modified circuit for deriving an output signal from the ring counter shown in FIG. 15.

FIGURE 14 of the drawings illustrates a module 140 which is a further modification in the control module 20 in which the coupling diode 54, the coil 22$a$ in the "X" winding means 22, and the reset terminal are removed. In all other respects, the control module 140 is identical to the control module 20. In general, the modules 140 are operated to store a data bit or to advance a count in the same manner as the module 20. However, the module 140 is reset by externally interrupting the source of latching potential rather than by energizing a reset terminal and a connected "X" winding means.

Figure 15:
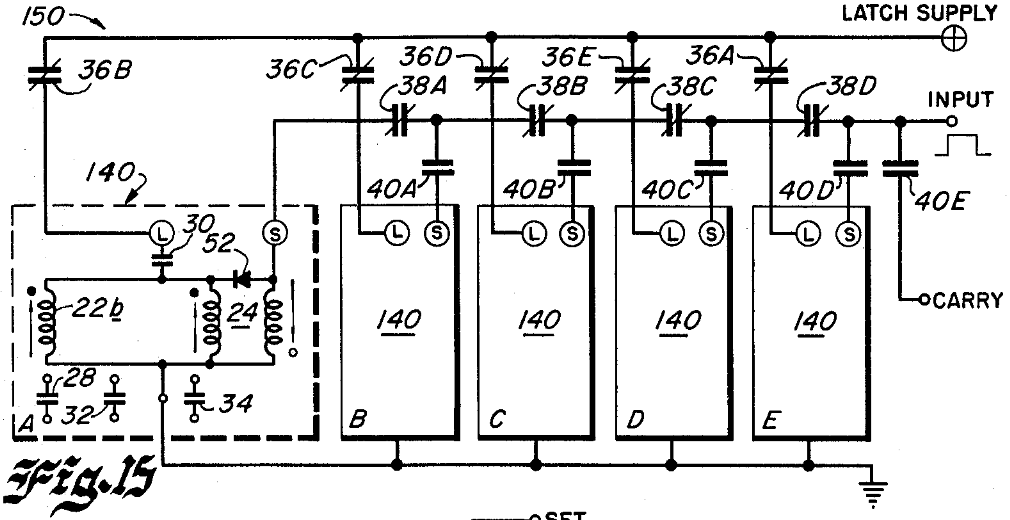
FIG. 15 is a schematic diagram of a ring counter using the control module shown in FIG. 14.

FIGURE 15 of the drawings illustrates a ring counter 150 using five control modules identified as "A–E" connected in ascending order, when considered from left to right in FIG. 15, by the "Y" groups of sealed switch units. The latch terminal of each of the "A–E" control modules 140 is connected to a source of latching potential through the normally closed contacts provided by the sealed switch 36 in the next highest order module 140 and, with the exception of the highest order or "E" control module 140, the normally open contacts provided by the sealed switch 40 in one control module 140 controls the application of signals to the set terminal of the next highest order module. The normally closed contacts provided by the sealed switch 38 in each control module 140 interrupts the path to its own set terminal.

In the normal condition of the counter 150, all of the "A–E" control modules 140 are in a normal or reset condition. When the first pulse is applied to the input terminal, it is forwarded through the closed contacts 38D, 38C, 38B and 38A to the set terminal of the "A" control module 140. This pulse energizes the coils 22$b$, 24$b$, and 24$a$. Since both coils of the "Y" winding means 24 are energized, the "Y" group of sealed switches including the switches 34, 36, 38, and 40 is not actuated. However, the energization of the coil 22$b$ actuates the three "X" group switches 28, 30, and 32 so that the normally open contacts provided by these sealed switches are closed. The closure of the contacts 30 in the "A" control module 140 connects the coils 22$b$ and 24$b$ to the source of latching potential through the normally closed contacts 36B. When the first input pulse is terminated, only the coils 22$b$ and 24$b$ in the "A" control module 140 are energized so that the "X" group of sealed switches remain operated and the "Y" group of sealed switches become actuated. This opens the contacts 36A and 38A and closes the contacts 40A. The opening of the contacts 36A does not perform any useful function at this time, and the opening of the contacts 38A interrupts the circuit for applying input pulses to the set terminal of the "A" control module 140. The closure of the contacts 40A prepares a circuit for applying the next input pulse of the set terminal of the "B" control module 140.

When the second pulse is applied to the input terminal, this pulse is forwarded through the closed contacts 38D, 38C, 38B, and 40A to the set terminal of the "B" control module 140. This actuates the "X" group of sealed switch units in this module so that when the second input pulse is terminated, the "Y" group of sealed switch units in the "B" module is actuated to open the contacts 36B and 38B and to close the contacts 40B. The opening of the contacts 36B removes the source of latching potential from the set "A" control module 140 so that this module restores to a normal condition to close the contacts 36A and 38A and to open the contacts 40A as well as the other contacts provided by the remaining sealed switch units. The closure of the contacts 38A prepares a path for applying an operating signal to the set terminal of the "A" control module 140, which circuit is interrupted at the open contacts 38B. The closure of the contacts 36A prepares the holding circuit for the "E" control module 140, and the opening of the contacts 40A interrupts the path for applying an input signal to the set terminal of the operated "B" control module 140. The closure of the contacts 40B when the "B" control module is operated prepares a path for applying the next input pulse to the set terminal of the "C" control module 140.

When the next three input pulses are applied to the input terminal, the "C," "D," and "E" control modules 140 are operated in sequence and the "B," "C," and "D" control modules 140 are reset. When the "E" control module 140 is set, the contacts 40E are closed to connect the carry terminal to the input terminal. Thus, when the next input signal appears, it is forwarded through the closed contacts 40E to provide a carry output and is also forwarded to the set terminal of the "A" control module 140 to operate this module. The operation of the "A" control module 140 resets the "E" control module 140 and prepares the counter 150 for an additional cycle of operation. The resetting of the "E" control module 140 opens the contacts 40E so that a carry output cannot be povided until the next cycle of operation of the counter 150 has been completed.

Figure 17:
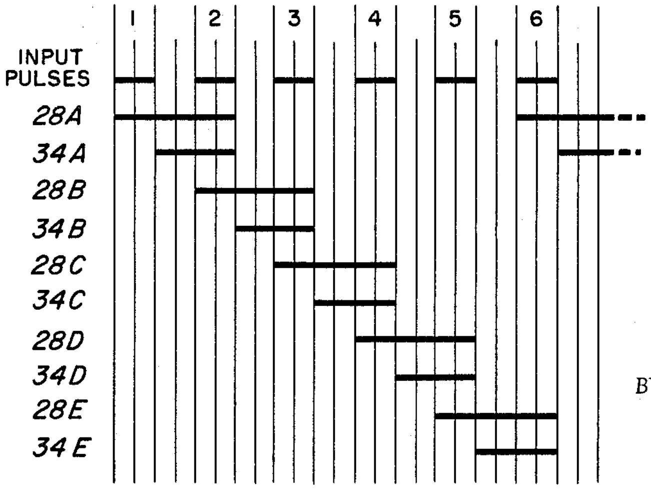
FIG. 17 is a timing diagram illustrating the sequence of operation of the magnetic sealed switches in the ring counter shown in FIG. 15.

The unused sealed switches 28 and 32 in the "X" group of sealed switches in each of the control modules 140 and the unused sealed switch units 34 in the "Y" group of sealed switches in each of the control modules 140 can be used to provide isolated outputs representing the values or counts stored in the circuit 150. These contacts can be connected in various ways to provide different types of output signals. FIGURE 17 of the drawings is a timing diagram illustrating the sequence in which and the duration for which each of the contacts in the counter is closed. The timing and duration of the input pulses are illustrated across the top of the timing diagram, and the closed circuit period of one of the "X" group sealed switches 28 and one of the "Y" group sealed switches 34 in each of the "A–E" control modules 140 is illustrated in the indicated lines of the diagram. Different types of output signals from the counting circuit 150 can be provided by selecting different ones of the "X" and "Y" group sealed switches and by connecting the selected switches in different manners.

As an example, if only the sealed switches 28 in the "A–E" control modules 140 are used to provide a readout signal, the output signal comprises a make-before-break relationship wtih a time overlap equal to the "on" time of the pulse. As illustrated in FIG. 17, the contacts 28A close at the beginning of the first input pulse and open at the termination of the second input pulse, and the contacts 28B close at the beginning of the second input pulse and remains closed until the termination of the third input pulse. If the "Y" group sealed switch units 34 in the control modules 140 are used to provide a readout, the output signal provides a make-before-break relationship with a time overlap of approximately one millisecond. As an example, the contacts 34A in the "A" control module 140 close at the termination of the first input pulse and remains closed until the termination of the second input pulse, while the contacts 34B close at the termination of the second input pulse and remains closed until the termination of the third input pulse. An overlap between these contact operations on the order of one millisecond is provided because the shunting effect of the coil 24$a$ slows the release of the switch 34 in the "A" module 140.

The control module 140 illustrated in FIG. 14 can also be modified by removing the sealed switch unit 32 and rearranging the sealed switches 28 and 30 within the axial opening in the "X" winding means 22 so that a permanent magnet is disposed immediately adjacent the sealed switch 28 to provide a field of sufficient strength to maintain the sealed switch 28 in a normally closed condition. The polarity of this permanent magnet is so chosen that it opposes the polarity of the field generated by the coil **22*b* in the control module 140. Thus, when the coil 22*b* is energized to close the normally open sealed switch 30, the normally closed sealed switch 28 is opened. When modified in this form and used in the counting circuit 150, the normally closed "X" group sealed switches 28 and the normally opened "Y" group sealed switches 34** can be connected as illustrated in FIG. 16 to provide a break-before-make output signal to a common output terminal.

In the circuit shown in FIG. 16, the normally open sealed switch 34 in one of the modified modules 140 is connected in series with the normally closed sealed switch 28 in the next highest order stage between the output terminal and a source of reference potential, such as ground. As an example, the normally open "Y" group sealed switch 34 in the "A" control module 140 is connected in series with the normally closed "X" group sealed switch 28 in the "B" control module 140 between the common output terminal and ground. When the "Y" group sealed switches in the "A" control module 140 are operated at the termination of the first input pulse, ground is forwarded through the contacts 28B and 34A to the output terminal. This ground signal persists until the beginning of the second input pulse which operates the "B" control module 140 to open the normally closed contacts 28B. This interrupts the application of ground to the common output terminal and provides an output signal having an "on" time equal to the time interval between the termination of the first input pulse and the beginning of the second input pulse, i.e., a break-before-make output. In a similar manner, the operation of the remaining stages of the counter 150 controls the remainder of the contacts illustrated in FIG. 16 to provide a break-before-make output signal.

Although the present invention has been described with reference to a number of illustrative embodiments thereof, it should be understood that numerous other modifications and embodiments thereof can be devised by those skilled in the art that will fall within the spirit and scope of the principles of this invention.

What is claimed as new and desired to be secured by Letters Patent of the United States is:

1. A bistable control module operable to two different states comprising first winding means having two windings providing oppositely directed magnetic fields, first contact means selectively operated between opened and closed conditions under the control of the magnetic fields provided by the first winding means, second winding means providing a magnetic field, second contact means selectively operated between opened and closed conditions under the control of the magnetic fields provided by the second winding means, first circuit means coupled to the first and second winding means for energizing the two windings in the first winding means and the second winding means to operate the second contact means, and second circuit means including the second contact means connected in series with one of the windings in the first winding means for energizing the said one of the windings in the first winding means to operate the first contact means.

2. A bistable module operable to two different states comprising first winding means having two windings providing magnetic fields, first contact means selectively operated between opened and closed conditions under the control of the magnetic fields provided by the first winding means, second winding means providing a magnetic field, second contact means selectively operated between opened and closed conditions under the control of the magnetic fields provided by the second winding means, first circuit means coupled to the first and second winding means for energizing the two windings in the first winding means to provide magnetic fields of opposite polarities and substantially equal strengths and for energizing the second winding means to provide a unidirectional magnetic field to operate the second contact means, and second circuit means coupled to the first and second winding means for energizing the second winding means to provide a unidirectional field for operating the second contact means and for energizing one of the windings in the first winding means to provide a unidirectional magnetic field to operate the first contact means.

3. The bistable module set forth in claim 2 in which the second circuit means includes the first contact means connected in series with one of the windings in the first winding means.

4. The bistable module set forth in claim 3 including an asymmetrical conducting device connected in series between the first contact means and the other winding in the first winding means.

5. A bistable control module operable to two different states comprising first winding means having two windings providing oppositely directed magnetic fields, first contact means selectively operated between opened and closed conditions under the control of the magnetic fields provided by the first winding means, second winding means providing a magnetic field, second contact means selectively operated between opened and closed conditions under the control of the magnetic fields provided by the second winding means, first circuit means coupled to the first and second winding means for energizing the two windings in the first winding means and the second winding means to operate the second contact means, and second circuit means coupled to the first and second winding means for energizing the second winding means and one of the windings in the first winding means to operate the first and second contact means.

6. The bistable circuit set forth in claim 5 in which the second circuit means includes the second contact means.

7. A bistable control module operable to two different states comprising first winding means having two windings providing oppositely directed magnetic fields, first contact means selectively operated between closed and opened conditions under the control of the magnetic fields provided by the first winding means, second winding means having two windings providing oppositely directed magnetic fields, second contact means selectively operated between closed and opened conditions under the control of the magnetic fields provided by the second winding means, first circuit means coupled to the first and second winding means for energizing the two windings in the first winding means and one winding in the second winding means to operate the second contact means, and second circuit means coupled to the first and second winding means for energizing the second winding means and one of the windings in the first winding means to operate the first and second contact means.

8. A control module operable to two different states including first winding means having two winding providing oppositely directed flux fields, first contact means selectively opened and closed by flux fields resulting from the energization of the first winding means, second winding means, second contact means selectively opened and closed by the flux fields resulting from the energization of the second winding means, a potential source for energizing the first and second winding means, first circuit means connected between the potential source and the first and second winding means for coupling the potential source to both of the windings in the first winding means and to the second winding means to operate the second contact means, said first circuit means including an asymmetrical conducting means connected in series between the potential source and one of the windings in the first winding means, the first contact means remaining in their normal state when the windings are energized by the first circuit means because of the oppositely directed flux fields produced by the energization of the two windings in the first winding means, and second circuit means including the second contact means connected in series between the potential source and said one winding in the first winding means for coupling the potential source to said one winding in the first winding means to operate the first contact means.

9. A control module operable to at least two different states including first winding means having two windings providing oppositely directed flux fields, first contact means selectively opened and closed by flux fields resulting from the energization of the first winding means, second winding means, second contact means selectively opened and closed by flux fields resulting from the energization of the second winding means, a potential source for energizing the first and second winding means, first circuit means including means for coupling the potential source to both of the windings in the first winding means and to the second winding means to operate the second contact means, the first contact means remaining in their normal state because of the oppositely directed flux fields produced by the energization of the two windings in the first winding means, and second circuit means connected to one of the windings in the first winding means and including the second contact means and rendered effective by the operation of the second contact means and the termination of the energization of the first and second winding means by the first circuit means for coupling the potential source to the said one of the windings in the first winding means to operate the first contact means.

10. A bistable control module operable to two different states comprising first winding means including a pair of windings providing oppositely directed magnetic fields, first contact means selectively operated between closed and opened conditions by the magnetic fields of the first winding means, second winding means providing a magnetic field, second contact means operated between closed and opened conditions by the magnetic fields of the second winding means, a reference potential terminal, first circuit means connecting one terminal of each of the windings in the first winding means and one of the terminals of the second winding means to the reference potential terminal, a first signal input terminal, second circuit means coupling the first signal input terminal to the other terminal of the second winding means and the other terminals of the two windings in the first winding means, said second circuit means including an asymmetrical conducting device connected between the first signal input terminal and one of the windings in the first winding means, a second signal input terminal, and third circuit means connecting the second signal input terminal to the other terminal of the said one winding in the first winding means.

11. A bistable module operable to two different states comprising first winding means including a pair of windings providing oppositely directed magnetic fields, first contact means selectively operated between closed and opened conditions by the magnetic fields of the first winding means, second winding means including a pair of windings providing oppositely directed magnetic fields, second contact means operated between closed and opened conditions by the magnetic fields of the second winding means, a reference potential terminal, first circuit means connecting one terminal of each of the windings in the first winding means and one terminal of each of the windings in the second winding means to the reference potential terminal, a first signal input terminal, second circuit means coupling the first signal input terminal to the other terminal of one winding in the second winding means and to the other terminals of the two windings in the first winding means, a second signal input terminal, and third circuit means connecting the second signal input terminal to the other terminal of the other winding in the second winding means and the other terminal of one winding in the first winding means.

12. The module set forth in claim 11 including an additional signal input terminal, and fourth circuit means connecting the additional signal input terminal to said one winding in the first winding means.

13. A bistable control module operable to two different states comprising first winding means including a pair of windings providing oppositely directed magnetic fields, first contact means selectively operated between closed and opened conditions by the magnetic fields of the first winding means, second winding means providing a magnetic field, second contact means operated between closed and opened conditions by the magnetic fields of the second winding means, a potential source having a reference potential terminal, first circuit means directly connecting one terminal of each of the windings in the first winding means and one terminal of the second winding means to the reference potential terminal, second circuit means coupling the potential source to the other terminal of the second winding means and to the other terminals of the two windings in the first winding means, said second circuit means including an asymmetrical conduction device connected in series between the potential source and the other terminal of one of the windings in the first winding means, and third circuit means connecting the potential source to the point of common connection of the asymmetrical conduction device and the said other terminal of the said one winding in the first winding means.

14. A bistable control module operable to two different states comprising first winding means including a pair of windings providing oppositely directed magnetic fields, first contact means selectively operated between closed and opened conditions by the magnetic fields of the first winding means, second winding means providing a magnetic field, second contact means operated between closed and opened conditions by the magnetic fields of the second winding means, a potential source having a reference potential terminal, first circuit means directly connecting one terminal of each of the windings in the first winding means and one terminal of the second winding means to the reference potential terminal, second circuit means coupling the potential source to the other terminal of the second winding means and to the other terminals of the two windings in the first winding means, said second circuit means including an asymmetrical conduction device connected between the potential source and both the other terminal of the second winding means and the other terminal of one of the windings in the first winding means, and third circuit means connecting the potential source to the other terminal of the second winding means and the other terminal of the said one winding in the first winding means, said third circuit means including the second contact means connected in series with the second winding means over a first path and in series with the said one winding in the first winding means over a second path parallel to the first path.

15. A control module comprising first and second winding means for providing magnetic fields, first sealed switch means operated between closed and opened conditions by the magnetic fields provided by the first winding means, second sealed switch means operated between closed and opened conditions by the magnetic fields provided by the second winding means, said first and second sealed switch means including magnetic members movable into and out of engagement under the control of an applied magnetic field, first circuit means for energizing the first and second winding means to produce a unidirectional flux field in the second sealed switch means to operate the second sealed switch means and to produce opposed flux fields in the first sealed switch means to prevent operation of the first sealed switch means, holding means operative when said first circuit means terminates the energization of said first and second winding means for applying a continuous unidirectional magnetic field to the second sealed switch means to hold the second sealed switch means operated and to energize the first winding means to apply a unidirectional magnetic field to said first sealed switch means to operate the first sealed switch means, and second circuit means for energizing the second winding means to overcome the continuing unidirectional magnetic field applied to the second sealed switch means by the holding means to release the second sealed switch means.

16. The control module set forth in claim 15 in which the holding means includes third circuit means controlled by the second sealed switch means for energizing the first winding means.

17. The control module set forth in claim 15 in which the holding means includes permanent magnet means disposed adjacent the second sealed switch means.

18. A control moduel comprising first contact means, a first pair of winding means providing oppositely directed flux fields for selectively operating the first contact means between closed and opened conditions, second contact means, a second pair of winding means providing oppositely directed flux fields for selectively operating the second contact means between opened and closed conditions, first circuit means connected to the first and second winding means for selectively energizing both of the first pair of winding means and one of the second pair of winding means, and second circuit means connected to the first and second winding means for energizing the second pair of winding means and one of the first pair of winding means, the first circuit means operating the second contact means and the second circuit means operating the first contact means, said first circuit means including a first asymmetrical conducting device connected in series with the other winding of the second pair of windings to prevent the energization of this other winding in the second pair of windings, said second circuit means including a second asymmetrical conducting device connected in series with the other winding in the first pair of windings to prevent the energization of the other winding in the first pair of windings.

19. A control module comprising first contact means, a first pair of winding means providing oppositely directed flux fields for selectively opening and closing the first contact means, second contact means, a second pair of winding means providing oppositely directed flux fields for selectively opening and closing the second contact means, first circuit means connected to the first and second winding means for energizing both of the first pair of winding means and one of said second pair of winding means to operate the second contact means, second circuit means connected to the first and second winding means for energizing both of the second pair of winding means and one of the first pair of winding means to operate the first contact means, and third circuit means connected to the first and second winding means for energizing one of the first pair of winding means and one of the second pair of windings to operate both of the first and second contact means.

20. A control module comprising first winding means including a pair of windings, one of the windings in the first winding means providing a magnetic field of a given polarity and the other winding in the first winding means providing an oppositely poled magnetic field, second winding means including a pair of windings, one of the windings in the second winding means providing a magnetic field of a given polarity and the other winding in the second winding means providing a magnetic field of an opposite polarity, the windings in said first and second winding means each having a pair of terminals, means connecting one terminal of each of said windings to a reference potential, first diode means directly interconnecting the other terminals of the two windings in said first winding means, second diode means directly interconnecting the other terminals of the two windings in the second winding means, first circuit means connecting two like electrodes of the first and second diode means together, first contact means operated to opened and closed conditions by the magnetic fields from the first winding means, and second contact means operated to opened and closed conditions by the magnetic fields from the second winding means.

21. The control module set forth in claim 20 including second circuit means connected to the first and second winding means and including the first diode means for energizing both of the windings in the first winding means and only a single winding in the second winding means.

22. The control module set forth in claim 21 including third circuit means connected to the first and second winding means and including said first contact means for applying a signal to the first circuit means to energize only a single winding in each of the first and second winding means.

23. A control module comprising first and second winding means, each of the first and second winding means including one winding providing a given flux field and another winding providing a flux field directed opposite to the given flux field, first contact means operated by the first winding means, second contact means operated by the second winding means, the first contact means including a normally closed pair of contacts and a normally open pair of contacts, first circuit means connected to the first and second winding means and including the normally closed contacts in the first contact means for momentarily energizing both of the windings in the first winding means and one winding in the second winding means to operate the second contact means, second circuit means connected to the first and second winding means and including the second contact means for continuing the energization of the one winding in the second winding means and for energizing only one winding in the first winding means after the momentary energization by said first circuit means to operate the first contact means, and third circuit means connected to the first and second winding means and including the normally open contacts in the first contact means for momentarily energizing one winding in the second winding means and both of the windings in the first winding means to restore said control module to a normal condition.

24. A bistable relay circuit comprising a pair of coils having one set of terminals connected to a reference potential and separate first and second terminals, at least one sealed switch unit having a pair of magnetic elements movable into engagement by an applied flux field of a given value, diode means connected between the first and second terminals, set signal input means connected to the first terminal to energize one of the coils to apply a flux field of the given value and of one polarity to the sealed switch to operate the sealed switch, reset signal input means connected to the second terminal for energizing the other coil to apply a flux field of an opposite polarity to the sealed switch, said reset means also being connected to the first terminal through the diode means to energize the said one coil to apply a flux field of the one polarity and the given value to the sealed switch so that the reset means releases the sealed switch.

25. The counting stage set forth in claim 24 including holding circuit means connected to the first terminal for maintaining the energization of the one coil, said holding circuit means including the closed sealed switch.

(References on following page)

References Cited by the Examiner

UNITED STATES PATENTS

| | | | |
|---|---|---|---|
| 2,634,376 | 4/1953 | Eck | 317—139 X |
| 2,999,227 | 9/1961 | Hezel et al. | 340—147 X |
| 3,017,542 | 1/1962 | Pearce | 317—140 |
| 3,020,369 | 2/1962 | Jacobson | 200—87 |
| 3,023,401 | 2/1962 | Loev | 340—174 |
| 3,042,900 | 7/1962 | Werts | 340—168 |
| 3,043,990 | 7/1962 | Lillquist | 317—123 |
| 3,056,906 | 10/1962 | Peters | 317—123 |
| 3,076,918 | 2/1963 | Hinkle et al. | 317—140 |
| 3,088,056 | 4/1963 | Tevonian | 317—155.5 X |
| 3,118,090 | 1/1964 | Weller | 317—137 |
| 3,174,080 | 3/1965 | Scott | 317—155.5 |
| 3,182,226 | 5/1965 | Peek | 317—137 |

FOREIGN PATENTS

| | | |
|---|---|---|
| 621,259 | 5/1961 | Canada. |

SAMUEL BERNSTEIN, *Primary Examiner.*

NEIL C. READ, *Examiner.*